United States Patent [19]

Buckley et al.

[11] 3,997,571
[45] Dec. 14, 1976

[54] COMPOUNDS CONTAINING FLUOROCARBON RESIDUES AND AZIDO GROUPS AS TEXTILE-FINISHING AGENTS

[75] Inventors: John Buckley; Richard Budziarek; Andrew John Nicholas; Edward Jervis Vickers, all of Manchester, England

[73] Assignee: Imperial Chemical Industries Limited, London, England

[22] Filed: Sept. 3, 1974

[21] Appl. No.: 502,881

[30] Foreign Application Priority Data

Sept. 10, 1973 United Kingdom ............ 42426/73
Sept. 10, 1973 United Kingdom ............ 42428/73

[52] U.S. Cl. .............................. 260/349; 427/394
[51] Int. Cl.² ...................................... C07C 117/00
[58] Field of Search ..................................... 260/349

[56] References Cited
UNITED STATES PATENTS

| | | | |
|---|---|---|---|
| 2,617,817 | 11/1952 | Ahlbrecht et al. ................ | 260/349 |
| 3,298,975 | 1/1967 | Feild et al. ........................ | 260/349 |

*Primary Examiner*—Lewis Gotts
*Assistant Examiner*—Cary Owens
*Attorney, Agent, or Firm*—Cushman, Darby & Cushman

[57] ABSTRACT

Textile-finishing agents are provided by compounds of the formula

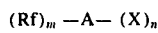

$(Rf)_m -A- (X)_n$ wherein Rf represents a fluorocarbon chain, A represents a linking group, X represents a sulphonazide or azidoformate group and *m* and *n* are integers. The Rf group may be a linear or branched fluorocarbon chain containing 2 to 12 carbon atoms, and the linking group A may be a simple organic linking group or it may be a macromolecular linking group. The simple linking groups may have one or more fluorocarbon chains and one or more azido groups attached thereto, while the macromolecular linking groups may have a considerable number of fluorocarbon and/or azido groups attached thereto.

3 Claims, No Drawings

COMPOUNDS CONTAINING FLUOROCARBON RESIDUES AND AZIDO GROUPS AS TEXTILE-FINISHING AGENTS

BRIEF SUMMARY OF THE INVENTION

This invention relates to compounds which contain both fluorocarbon residues and azido groups and to the use of such compounds as textile finishing agents.

Thus according to the present invention there are provided compounds of the formula $$(Rf)_m - A - (X)_n$$

wherein Rf represents a fluorocarbon chain, A represents a linking group, X represents a sulphonazide or an azidoformate group and $m$ and $n$ are integers.

The fluorocarbon chain Rf is terminated with a —CF$_3$ radical and is preferably linear containing from 6 to 12 carbon atoms.

Examples of such linear fluorocarbon radicals are those of the formula $CF_3(CF_2)_m$—, where $m$ is an integer from 5 to 11.

Although the preferred compounds contain linear fluorocarbon radicals, those containing branched chain or unsaturated fluorocarbon radicals are also included within the invention. Examples of unsaturated fluorocarbon radicals are those of the formula $C_mF_{2m-1}$, wherein $m$ is from 6 to 12. An example of an unsaturated and branched fluorocarbon radical is

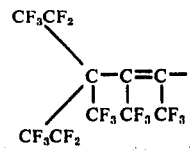

The group X contains an azido group and is a sulphonazide of formula —SO$_2$N$_3$ or an azidoformate group of formula -OCON$_3$.

The linking group A may be a simple organic linking group having one or more fluorocarbon chains and one or more azido groups attached thereto or it may be a macromolecular linking group having a considerable number of fluorocarbon and/or azido groups attached thereto. When the linking group is a simple organic linking group the values of $m$ and $n$ will conveniently be 1 to 2 particularly 1. In the latter case the compound of the invention will consist of a fluorocarbon radical attached through a linking group to a sulphonazide or azidoformate group.

When the group A is a simple organic linking group it may be alkyl, cycloalkyl, aryl or aralkyl and preferably contains ester, ether or amide radicals.

Examples of linking groups of this type include the following:

—COOCH$_2$CH$_2$—

—COOCH$_2$CH$_2$OCH$_2$CH$_2$—

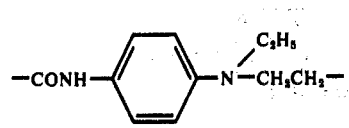

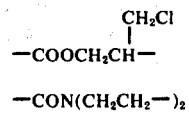

—CON(CH$_2$CH$_2$—)$_2$

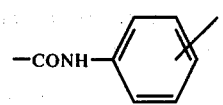

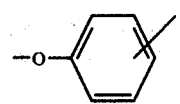

Examples of fluorocarbon compounds of the present invention wherein A is a simple organic linking group include

C$_7$F$_{15}$COOCH$_2$CH$_2$OCON$_3$

C$_7$F$_{15}$COOCH$_2$CH$_2$OCH$_2$CH$_2$OCON$_3$

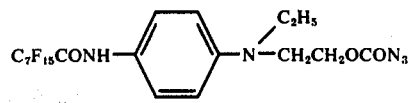

C$_7$F$_{15}$CON(CH$_2$CH$_2$OCON$_3$)$_2$

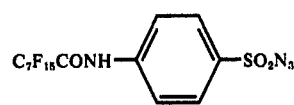

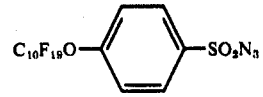

and the corresponding compounds wherein the fluorocarbon radical contains from 6 to 12 carbon atoms.

Such compounds may be made by a variety of routes, for example:

a. reacting a hydroxyalkyl ester of a perfluorocarboxylic acid with phosgene to give the chloroformate and reacting the product with either sodium azide, or with hydrazine followed by nitrous acid.

e.g.  Rf—COOCH$_2$CH$_2$OH → RfCOOCH$_2$CH$_2$OCOCl →
RfCOOCH$_2$CH$_2$OCON$_3$ b. reacting a perfluorocarboxylic acid chloride with an amine containing a hydroxy group and then converting the hydroxy group in the amide so formed, to an azidoformate group as in (a) above.

c. reacting a perfluorcarboxylic acid halide with an amine containing a sulphonyl halide group and then converting the sulphonyl halide to the azide.

d. reacting a perfluorohydrocarbyl ether of an aryl sulphonyl halide with sodium azide.

When the linking group A is a macromolecular linking group it may be a macromolecular group produced by polymerisation of vinyl monomers having azido and/or fluorocarbon chains attached.

A preferred macromolecular linking group is a polyacrylic group produced by copolymerisation of two or more acrylic monomers for example acrylates or acrylamides having azido or fluorocarbon residues attached thereto.

Compounds of the present invention wherein the linking group A is a macromolecular group may be made from any mixture of vinyl monomers providing that a. one of the monomers contains a fluorocarbon chain and
b. one of the monomers contains an azido group.

Thus the resulting copolymers will contain both azido groups and fluorocarbon chains.

The copolymers may be copolymers of two vinyl monomers each of which fulfils one of the conditions (a) or (b) above. Alternatively there may be more than one monomer fulfilling conditions (a) or (b) and/or there may also be in addition other vinyl monomers used which do not fulfil either (a) or (b).

Fluorocarbon chain-containing monomers include those of the formula

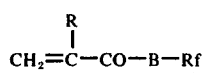

wherein Rf is a fluorocarbon chain, B is a linking group and R is hydrogen or lower alkyl group containing from 1 to 4 carbon atoms particularly methyl.

Examples of the linking group B include the groups

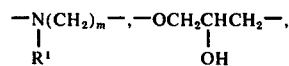

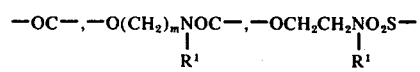

and —NHC$_6$H$_4$NHOC—, wherein $m$ is an integer and R$^1$ is hydrogen or a lower alkyl group of from one to four carbon atoms.

As examples of vinyl monomers which contain a fluorocarbon chain there may be mentioned

CH$_2$=CHCOOCH$_2$CH$_2$OOCC$_7$F$_{15}$

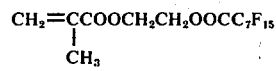

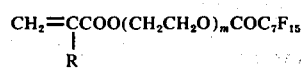

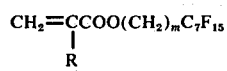

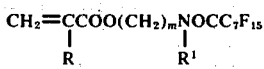

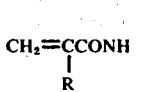

wherein R is hydrogen or methyl, R$^1$ is hydrogen or lower alkyl, e.g. ethyl and $m$ is an integer together with the related compounds wherein the fluorocarbon residue contains from 6 to 12 carbon atoms.

Monomers containing azido groups include those containing either azidoformate or sulphonyl azido groups.

They include those of the general formula

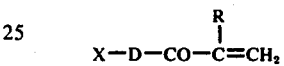

wherein X is the OCON$_3$ or -SO$_2$N$_3$ groups, D is a linking radical and R is hydrogen or lower alkyl of from 1 to 4 carbon atoms, particularly methyl.

Examples of linking radicals D include —OCH$_2$CH$_2$—, —(OCH$_2$CH$_2$)$_m$—,

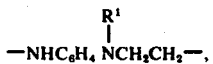

—OCH$_2$CH(CH$_2$Cl)—, —NHCH$_2$CH$_2$—, —N(CH$_2$CH$_2$—)$_2$ and —NHC$_6$H$_4$— wherein $m$ is an integer and R$^1$ is a hydrogen or alkyl of from 1 to 4 carbon atoms.

Specific examples of vinyl monomers containing azido groups include

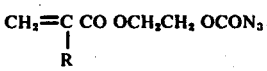

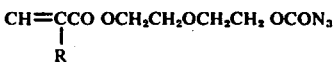

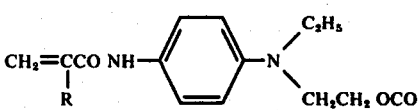

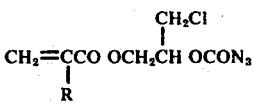

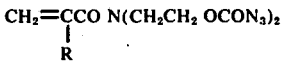

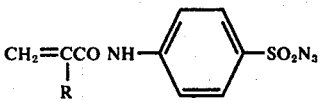

Examples of vinyl monomers which may also be included in the copolymers of the present invention include the methyl, ethyl and butyl esters of acrylic and methacrylic acids, acrylonitrile, acrylamide and vinyl acetate.

One particular class of vinyl monomers which may be incorporated in the production of copolymers of the present invention is a vinyl monomer containing oxyethylene groups, particularly monomers of the formulae

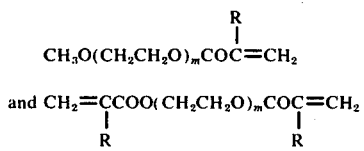

where R is hydrogen or methyl and $m$ has an average value of from 5 to 120, preferably 5 to 35.

Thus, examples of specific compounds of the present invention wherein A is a macromolecular group include copolymers of the following group of monomers

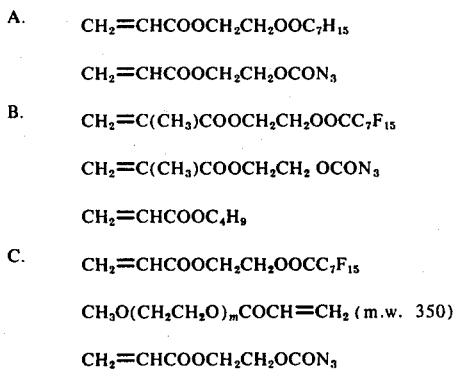

The above copolymers of the present invention may be made using any of the known methods for the polymerisation of vinyl monomers. For example, the monomers may be mixed and a known polymerisation catalyst, for example a peroxide, introduced; the polymerisation should preferably be carried out in the absence of air and oxygen. The technique of aqueous emulsion polymerisation may also be used.

The fluorocarbon azido compounds of the present invention are useful for application to textile materials particularly synthetic polymeric textile materials such as for example polyesters, polyamides and polyacrylonitrile in that application of the fluorocarbon azido compound modifies the surface of the synthetic polymeric textile material.

They may be applied to textile materials by a simple padding process using a solution or dispersion of the azido compound in a solvent for example a halogenated hydrocarbon such as perchloroethylene or methylene dichloride or by applying an aqueous dispersion thereof and may be fixed on the substrate by baking, for example at 100°–200° C.

It is possible to produce a variety of effects on the textile materials, for example polymeric fibres and textile materials may be treated to obtain water or oil repellency, anti-static, anti-soil or wash fast finishes possessing durable effects.

The invention is illustrated by the following examples in which all parts and percentages are by weight except where otherwise stated.

EXAMPLE 1

Perfluorooctanoic acid ($\beta$-hydroxy-)ethyl ester (28 parts) was added dropwise to liquid phosgene (28 parts) at 0°–5° C over 1¼ hours. The temperature of the reaction mixture was raised to 10°–12° C, and stirring continued for a further 4 hours after which time the excess phosgene was blown off with a stream of dry nitrogen to leave the required chloroformate (27.8 parts) of the formula:

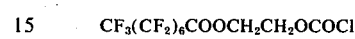

The above chloroformate was dissolved in ether (50 parts), the solution added to a solution of sodium azide (7.0 parts) in water (50 parts) and the mixture stirred for 16 hours at room temperature.

The aqueous layer was separated, extracted twice with ether (2 × 20 parts), the combined ether extracts were then washed with cold water (2 × 50 parts) and finally dried over anhydrous magnesium sulphate. Evaporation of the solution under reduced pressure at 20°–25° C yielded the desired azidoformate (25 parts) as a colourless oil, having the structure:

EXAMPLE 2

The azidoformate having the structure $CF_3(CF_2)_6COOCH_2CH_2OCH_2CH_2OCON_3$ was prepared by reacting the hydroxy-ester (46 parts) having the structure $CF_3(CF_2)_6COOCH_2OCH_2CH_2OH$, which was derived from perfluorooctanoic acid and 2 mols of ethylene oxide, with phosgene (20 parts) and subsequently with sodium azide (13 parts) by the procedure described in Example 1.

EXAMPLE 3

Perfluorooctanoyl chloride (1.442 parts) was added dropwise to a solution of 4-amino-N-$\beta$-hydroxyethyl aniline (1.8 parts) in diethyl ether (200 parts) under nitrogen at 5° C, and the reaction mixture was stirred at that temperature for 3 hours. The diethyl ether was removed under reduced pressure and the residue treated with a solution of sodium hydroxide (0.133 parts) in water (150 parts). The solid was filtered off and recrystallised from toluene to give the intermediate of the formula:

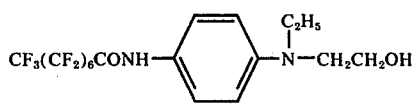

The above intermediate (1.0 part) was dissolved in methylene dichloride (50 parts), the solution added dropwise to a solution of phosgene (1.0 part) in methylene dichloride (30 parts) with stirring at 5° C and the reaction mixture was then stirred at that temperature for 3 hours. Excess phosgene was removed with nitrogen under reduced pressure, the resulting solution was treated with sodium azide (1.0 part), and the reaction mixture was stirred with Ballatine glass beads No. 8 (20.0 parts) at room temperature for 72 hours. The glass beads were filtered off and the solution evaporated to dryness to give the product of the formula:

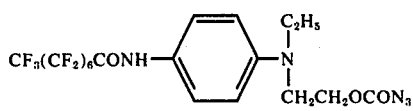

EXAMPLE 4

Epichlorohydrin (3.09 parts) was added dropwise to a mixture of perfluorooctanoic acid (13.80 parts), anhydrous ferric chloride (0.5 parts) at 30° C and the reaction mixture stirred at 50° C under nitrogen for 6 hours. The reaction mixture was then cooled to room temperature diluted with carbon tetrachloride (200 parts), the ferric trichloride filtered off, and the solution was evaporated under reduced pressure to give the intermediate of the formula:

The above intermediate was then dissolved in methylene dichloride (50 parts) and the solution was added dropwise to a solution of phosgene (33.0 parts) in methylene dichloride (150 parts) and triethylamine (2.37 parts) at 5° C with stirring. The reaction mixture was stirred at 5° C for 2 hours and then at 40° C for further 3 hours. Excess phosgene was removed under reduced pressure, the precipitate filtered off, the resulting solution added to sodium azide (2.2 parts) and the reaction mixture was stirred at room temperature for 48 hours. The filtered solution was evaporated to dryness under reduced pressure to give the product of the formula:

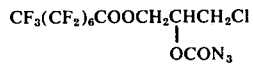

EXAMPLE 5

Liquid phosgene (20 parts) was added to a solution of dry pyridine (5.2 parts) in dry ether (70 parts) at 0°–5° C over 15 minutes. A solution of perfluorooctanoic acid-N,N-bis(β-hydroxyethyl)-amide (15 parts) in dry ether (50 parts) was then added to the above mixture and the whole stirred for 4 hours at 35°–40° C. Excess phosgene was blown off with a stream of dry nitrogen, the residual mixture filtered to remove pyridine hydrochloride and the filtrate evaporated under reduced pressure at 25°–30° C to leave the required bis-chloroformate (16.5 parts) of the formula:

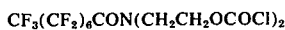

The above chloroformate (15.5 parts) was dissolved in ether (70 parts) and the solution added to a solution of sodium azide (12 parts) in water (25 parts) over 30 minutes at 0°–5° C. The mixture was stirred for 1 hour at 20°–25° C, the aqueous layer separated and extracted with ether (2 × 20 ml), the combined ether extracts were then washed with saturated brine (20 parts) and dried over anhydrous magnesium sulphate. Filtration and evaporation of the solution under reduced pressure at 25°–30° C yielded the azidoformate (15.2 parts) of the structure:

EXAMPLE 6

A solution of p-aminobenzene sulphonyl fluoried (6.7 parts), 2:6 lutidine (3.4 parts) in dry ether (25 parts) was stirred at 10°–15° C. This was treated with a solution of perfluorooctanoic acid chloride (14.6 parts) in ether (20 parts) added dropwise over 1 hour. The mixture was stirred at room temperature for a further 2 hours, after which time it was filtered to remove 2:6 lutidine hydrochloride and the filtrate evaporated to give the sulphonamide (18.4 parts) as a pale yellow solid, m.p. 98° C, having the structure:

A solution of the above amido-sulphonyl fluoride (18 parts) in ether (70 parts) was added over 30 minutes to a solution of sodium azide (7 parts) in water (30 parts) and the resultant mixture stirred at 40° C for 8 hours. The layers were separated and the aqueous phase extracted twice with fresh ether (2 × 20 parts). The combined ether extracts were washed with 20% brine (20 parts) and then dried over anhydrous magnesium sulphate. Removal of the solvent under reduced pressure yielded the required sulphonyl azide (16 parts) as a pale yellow solid having the structure:

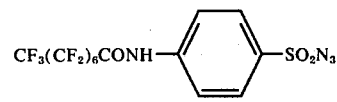

The same compound was prepared by the following alternative method:

A solution of p-aminobenzene-sulphonylfluoride (9.5 parts) dissolved in ethylacetate (25 parts) was added to a solution of sodium azide (6.5 parts) in water (25 parts), the resulting mixture stirred at 40°–50° C for 24 hours. The layers were separated, and the aqueous layer was further extracted with ethylacetate (2 × 20 parts). The combined ethylacetate solutions were washed with 1% brine (20 parts) and then dried over anhydrous magnesium sulphate. Removal of the solvent under reduced pressure left the sulphonyl azide (8 parts) of the formula:

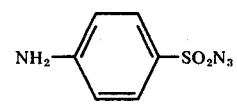

A solution of the above sulphonyl azide (7.3 parts) in dry ether (70 parts) and 2:6 lutidine (3.4 parts) treated with a solution of perfluorooctanoic acid chloride (14.4 parts) in dry ether (20 parts) added dropwise at such a rate that the temperature of the reaction did not exceed 20° C. The mixture was stirred for 3 hours at 20°–25° C and then filtered to remove 2:6 lutidine hydrochloride. Evaporation of the filtrate left a yellowish thick oil, which crystallised on standing to the desired sulphonyl azide (20 parts).

EXAMPLE 7

The fluorocarbon sulphonic acid derivative (13.6 parts) having the structure:

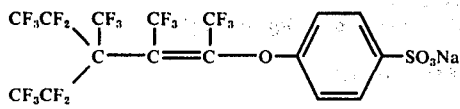

was added portionwise to chlorosulphonic acid (25 parts) below 10° C over 1 hour with stirring. When all the solid had dissolved, thionyl chloride (4.5 parts) was added to the solution over 10 minutes and the mixture stirred for 5 hours at 30°–35° C. The mixture was then cooled to below 0° C in an ice/salt bath and drowned into a mixture of concentrated hydrochloric acid (170 parts) and ice (400 parts). The soft solid produced was extracted with ether (100 parts) and the extract washed once with N/10 sodium bicarbonate solution and twice with ice-cold water. The ethereal solution of the derived sulphonyl chloride was next added portionwise to a solution of sodium azide (3 parts) in water (30 parts) below 10° C. The mixture was stirred and refluxed at 35°–40° C for 16 hours. The layers were separated and the aqueous phase further extracted with ether (50 parts). The combined ether extracts were washed once with N/1 sodium bicarbonate solution (50 parts) and twice with cold water (50 parts) before drying over anhydrous magnesium sulphate. Removal of the solvent under reduced pressure yielded a viscous oil, which solidified on standing to the desired sulphonyl azide as colourless crystals (7.5 parts) of the structure:

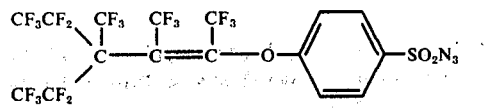

EXAMPLE 8

Polyethylene terephthalate and nylon 66 filament fabrics were impregnated with a solution of the above fluorocarbon azides (Examples 1 to 7) in methylene dichloride and the fabric dried so that approximately 1%–2% by weight of the fluorocarbon derivative remained on the fabric. The fabric was then baked at 150° C for 10 minutes or 175°–200° C for one minute and then extracted with perchloroethylene at room temperature. The treated fabrics showed good/excellent fixation varying between 50% and 90% and very good oil repellency ratings, varying between 90 and 100+. The durability of the finish was maintained after washing with water at 65°–70° C in the presence of soap or detergent for 1 hour.

Oil repellency was evaluated by a method described in Textile Research Journal, 1962, 32, 321.

EXAMPLE 9

A solution of perfluorooctonyl chloride (8.65 parts) in diethyl ether (10 parts) was added dropwise with vigorous stirring to a solution of β-hydroxyethyl acrylate (2.32 parts), 2:4:6-trimethyl pyridine (2.22 parts) in diethyl ether (40.0 parts) at room temperature and the reaction mixture stirred at that temperature for 16 hours. The precipitate was filtered off and the filtrate evaporated to dryness under reduced pressure to give the product of the formula:

$$CH_2=CHCOOC_2H_4OCO(CF_2)_6CF_3 (A)$$

The above monomer A (3.22 parts) was mixed with carbon tetrachloride (5.5 parts), the azidoformate monomer B (2.26 parts) of the formula:

$$CH_2=CHCOOCH_2CH_2OCON_3$$

(derived from β-hydroxylethylacrylate), α:α'-azobisisobutyro-nitrile (0.3 parts) and the resulting mixture added dropwise over 1 hour to a preheated flask at 80° C with stirring under nitrogen. The mixture was stirred at 77° C for 2 hours, and the solvent removed under reduced pressure to give the required copolymer of molar ratio A:B = 1:2.

EXAMPLE 10

A mixture of butyl acrylate (3 parts), monomer C, the azidoformate (1 part) having the structure $CH_2=C(CH_3)COOC_2H_4OCON_3$, monomer B, the fluorocarbon (1 part) having the structure $C_7F_{15}COOC_2H_4$

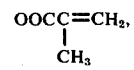

monomer A, and α-α'-azo-bisisobutyronitrile (0.05 parts) in ethylene dichloride (10 parts) was added dropwise over 2½ hours to a flask preheated to 60°–65° C with stirring in an atmosphere of nitrogen. The resultant mass was washed twice with methanol (3 × 20 parts) to leave a white rubbery copolymer (3.6 parts) having the molar ratios of A:B:C = 1:2.66:14.

EXAMPLE 11

Solutions of potassium persulphate (0.1 parts) in water (12.5 parts), and of potassium metabisulphate (0.1 parts) in water, a mixture of butyl acrylate (18.7 parts), monomer C, the azidoformate (3.32 parts) having the structure

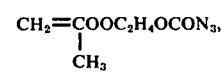

monomer B, and the fluorocarbon (4.4 parts) having the structure

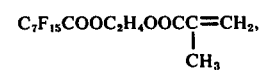

monomer A, were added concomitantly at 50° C to a stirred solution of sodium dodecylbenzene sulphonate (12.5 parts of 40% aqueous paste) in water (75 parts) over 6 hours. The resulting mixture was stirred in an atmosphere of nitrogen overnight at 50° C to give an emulsion of the required copolymer having the molar ratios of A:B:C = 1:2:20.

Another copolymer having the molar ratios A:B:C = 1:2:3 was prepared from the above monomer C (3.45 parts), monomer B (1.8 parts) and monomer A (4.9 parts) using the same procedure.

EXAMPLE 12

A solution of acryloyl chloride (40.0 parts) in dry toluene (60 parts) was added dropwise to a solution of methoxypolyethylene glycol of approximate molecular weight 350 (140 parts) in dry toluene (240 parts), 2:4:6-trimethyl pyridine (53.2 parts) and the reaction mixture stirred at 40° C in an atmosphere of nitrogen for 16 hours. The precipitate was filtered off and the solution evaporated to dryness under reduced pressure to give the required monomer C of the formula:

$$CH_3O(CH_2CH_2O)_nCOCH=CH_2$$

where $n$ = approximately 7.

The above monomer C (4.8 parts) was mixed with monomer A of the formula $CH_2=CHCOOC_2H_4OCO(CF_2)_6CF_3$ (2.13 parts), monomer B of the formula $CH_2=CHCOOC_2H_4OCON_3$ (2.2 parts) carbon tetrachloride (20.0 parts), α:α'azo-bisisobutyronitrile (0.05 parts) and the resulting mixture stirred at 77° C under nitrogen for 2 hours. The solution was evaporated to dryness under reduced pressure to give the required copolymer of molar ratio A:B:C = 1:3:3.

EXAMPLE 13

Instead of the methoxy polyethylene glycol acrylate described in Example 12, the acrylate derived from methoxy polyethylene glycol of approximate molecular weight 750 was used as the monomer C (3.7 parts), and the same azidoformate B (0.75 parts) and the fluorocarbon A (6.45 parts) as in Example 4, to prepare a copolymer of molar ratio of A:B:C = 3:1:1.

EXAMPLE 14

Polyethylene terephthalate and nylon 66 filament fabrics were impregnated with a solution of the above copolymers (Examples 9 to 13) in methylene dichloride and the fabric dried so that approximately 1%–2% by weight of the copolymer remained on the fabric. The fabric was then baked at 150° C for 10 minutes or 175°–200° C for 1 minute and then extracted with perchloroethylene at room temperature. The treated fabrics showed good/excellent fixation varying between 50% and 90% and very good oil repelling ratings, varying between 90 and 100+. The durability of the finish was maintained after washing with water at 65°–70° C in the presence of soap or detergents for 1 hour.

Oil repellency was evaluated by the method described in Textile Research Journal, 1962, 32, 321.

We claim:
1. A compound of the formula

(Rf) —A— (X)$_n$ wherein Rf represents a fluorocarbon chain containing from 6 to 12 carbon atoms, A represents a linking group, X represents a sulphonazide or azidoformate group and $n$ is 1 or 2, the linking group A being selected from the group consisting of

—COOCH$_2$CH$_2$—

—COOCH$_2$CH$_2$OCH$_2$CH$_2$—

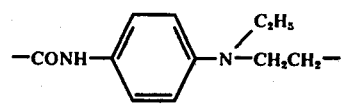

—CON(CH$_2$CH$_2$—)$_2$

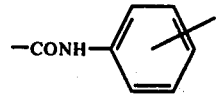

and 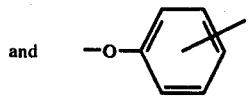

2. A compound as claimed in claim 1 wherein Rf represents a linear fluorocarbon chain containing from 6 to 12 carbon atoms.

3. A compound as claimed in claim 1 wherein Rf represents a branched fluorocarbon chain containing from 6 to 12 carbon atoms.

* * * * *